(12) United States Patent
Kurachi et al.

(10) Patent No.: US 7,309,671 B2
(45) Date of Patent: Dec. 18, 2007

(54) GLASS COMPOSITION, GLASS ARTICLE, GLASS SUBSTRATE FOR MAGNETIC RECORDING MEDIA, AND METHOD FOR PRODUCING THE SAME

(75) Inventors: Junji Kurachi, Osaka (JP); Akihiro Koyama, Osaka (JP); Nobuyuki Yamamoto, Osaka (JP)

(73) Assignees: Nippon Sheet Glass Co., Ltd., Osaka (JP); Hoya Corporation, Tokyo (JP)

( * ) Notice: Subject to any disclaimer, the term of this patent is extended or adjusted under 35 U.S.C. 154(b) by 151 days.

(21) Appl. No.: 10/442,933

(22) Filed: May 22, 2003

(65) Prior Publication Data

US 2003/0220183 A1 Nov. 27, 2003

(30) Foreign Application Priority Data

May 24, 2002 (JP) .......................... P.2002-150040

(51) Int. Cl.
*C03C 3/087* (2006.01)
*G11B 5/706* (2006.01)

(52) U.S. Cl. .................. 501/70; 428/846.9; 428/410; 65/30.14; 65/99.2

(58) Field of Classification Search .................. 501/70; 428/410, 846.9; 65/99.2, 30.14
See application file for complete search history.

(56) References Cited

U.S. PATENT DOCUMENTS 5,277,946 A * 1/1994 Nagai et al. ................ 428/426

| | | | |
|---|---|---|---|
| 5,776,844 A * | 7/1998 | Koch et al. | 501/70 |
| 5,780,371 A * | 7/1998 | Rifqi et al. | 501/67 |
| 5,858,897 A * | 1/1999 | Maeda et al. | 501/70 |
| 6,297,182 B1 * | 10/2001 | Maeda et al. | 501/66 |
| 6,313,052 B1 * | 11/2001 | Nakashima et al. | 501/69 |

FOREIGN PATENT DOCUMENTS

| JP | 08057953 A | * | 3/1996 |
| JP | 11180728 A | * | 7/1999 |
| JP | 11335133 A | * | 12/1999 |
| JP | 2002167230 A | * | 6/2002 |

* cited by examiner

*Primary Examiner*—Karl E Group
(74) *Attorney, Agent, or Firm*—Sughrue Mion, Pllc.

(57) ABSTRACT

A glass substrate of the present invention for magnetic recording media having high heat resistance and easy chemical strengthening ability at once has not been obtained, which is a glass composition essentially comprising 60 to 70 wt % $SiO_2$, 5 to 20 wt % $Al_2O_3$, 0 to 1 wt % $Li_2O$, 3 to 18 wt % $Na_2O$, 0 to 9 wt % $K_2O$, 0 to 10 wt % MgO, 1 to 15 wt % CaO, 0 to 4.5 wt % SrO, 0 to 1 wt % BaO, 0 to 1 wt % $TiO_2$ and 0 to 1 wt % $ZrO_2$, wherein the sum of $Li_2O$, $Na_2O$ and $K_2O$ is from 5 to 25 wt %, and the sum of MgO, CaO, SrO and BaO is from 5 to 20 wt %.

10 Claims, No Drawings

GLASS COMPOSITION, GLASS ARTICLE, GLASS SUBSTRATE FOR MAGNETIC RECORDING MEDIA, AND METHOD FOR PRODUCING THE SAME

FIELD OF THE INVENTION

The present invention relates to a glass composition having high heat resistance and capable of giving a high degree of strengthening according to a chemical strengthening treatment by an ion exchange, and a glass article containing the glass composition. In particular, the invention relates to a glass substrate useful for magnetic recording media. Further, the invention relates to a method for producing a sheet glass having high heat resistance and capable of giving a high degree of strengthening according to a chemical strengthening treatment by an ion exchange.

DESCRIPTION OF THE RELATED ART

Glass has excellent properties which the other substances do not have, such as high surface smoothness and high surface hardness, and is suitable for substrates for information recording media, such as hard disk drives (magnetic recording devices).

However, glass has the disadvantage that it is easily broken or cracked. As a countermeasure against this, a compression stress has been given to a surface of glass by rapid cooling or an ion exchange, that is to say, a so-called strengthening treatment has been conducted. Above all, a chemical strengthening treatment by an ion exchange is suitable for materials for substrates requiring particularly high dimensional accuracy, because of exceedingly small deformation of glass.

Japanese Patent No. 2,837,134 discloses a glass substrate for information recording formed from a chemically strengthened glass obtained by subjecting a glass for chemical strengthening containing 62 to 75 wt % $SiO_2$, 5 to 15 wt % $Al_2O_3$, 4 to 10 wt % $LiO_2$, 4 to 12 wt % $Na_2O$ and 5.5 to 15 wt % $ZrO_2$, and having an $Na_2O/ZrO_2$ ratio of 0.5 to 2.0 by weight and an $Al_2O_3/ZrO_2$ ratio of 0.4 to 2.5 by weight to an ion-exchange treatment with a molten salt containing Na ions and/or K ions. However, this glass has the disadvantage that the heat resistance of the glass itself is low even when it is subjected to the chemical strengthening treatment by the ion exchange. That is to say, with a recent increase in recording density, the layer constitution of a magnetic material formed on a substrate has been complicated and highly developed, and there has been a tendency to necessitate an increase in substrate temperature in forming the layers. In particular, a magnetic material for perpendicular magnetic recording which is hereafter expected to become the mainstream necessitates a particularly high temperature (for example, 400° C. or higher) in forming it. At the high temperature, the problem that a roughness in surface of the glass or a deformation of the glass is caused, has been encountered. For example, in a conventional production process of a glass for a magnetic disc substrate, a polishing of the glass surface is carried out. A residual stress is caused in the glass surface, since pressure is put on the glass surface at the polishing. When the glass in state of the above is exposed to a high temperature, a thermal relaxation of the residual stress is caused, and projections are formed in the glass surface. As a result, the glass surface become rough. The glass warps and deforms by heat at the high temperature.

JP-A-9-2836 (the term "A" as used herein means laid-open publication) discloses a glass substrate for magnetic disks obtained by subjecting a glass containing 50 to 65 wt % $SiO_2$, 5 to 15 wt % $Al_2O_3$, 2 to 7 wt % $Na_2O$, 4 to 9 wt % $K_2O$ (the sum of $Na_2O$ and $K_2O$ is from 7 to 14 wt %), 12 to 25 wt % (MgO+CaO+SrO+BaO) and 1 to 6 wt % $ZrO_2$ to a chemical strengthening treatment. However, although this glass substrate has high heat resistance, there are problems; the strength thereof is insufficient to withstand the centrifugal force of a recent magnetic disk drive (HDD) in which a magnetic recording medium is driven for rotation at high speed, or the collision of a magnetic recording medium with a recording head in a so-called load-unload system in which the magnetic recording medium gets off from the recording head in stopping the magnetic recording medium and the recording head is loaded on the magnetic recording medium in rotating.

SUMMARY OF THE INVENTION

The invention has been made taking it as a technical subject to solve the above-mentioned problems. An object of the invention is to provide a glass that a roughness in surface of the glass or a deformation of the glass is not caused, even when it is subjected to a high-temperature treatment in producing a magnetic recording medium, and further obtains high mechanical strength according to a chemical strengthening treatment by an ion exchange. Another object of the invention is to provide a method for producing the glass.

According to the invention, there is provided (1) a glass composition essentially comprising:

60 to 70 wt % $SiO_2$;
5 to 20 wt % $Al_2O_3$;
0 to 1 wt % $Li_2O$;
3 to 18 wt % $Na_2O$;
0 to 9 wt % $K_2O$;
0 to 10 wt % MgO;
1 to 15 wt % CaO;
0 to 4.5 wt % SrO;
0 to 1 wt % BaO;
0 to 1 wt % $TiO_2$; and
0 to 1 wt % $ZrO_2$, wherein the sum of $Li_2O$, $Na_2O$ and $K_2O$ is from 5 to 25 wt %, and the sum of MgO, CaO, SrO and BaO is from 5 to 20 wt %.

A chemical strengthening treatment can give high mechanical strength to a glass article obtained from the glass composition of (1). Even when the glass is subjected to a high-temperature heat treatment, the glass is not deformed by heat. Further, no unevenness caused by alkali elution is formed on a surface thereof.

There is further provided (2) the glass composition according to (1), which essentially comprises:

60 to 70 wt % $SiO_2$;
8 to 15 wt % $Al_2O_3$;
8 to 16 wt % $Na_2O$;
0 to 3.5 wt % $K_2O$;
2 to 5 wt % MgO;
3 to 7.5 wt % CaO;
0 to 4.5 wt % SrO; and
0 to 1 wt % $ZrO_2$, wherein the sum of $Na_2O$ and $K_2O$ is from 11 to 18 wt %, and the sum of MgO, CaO and SrO is from 7 to 14 wt %.

More certainly, a chemical strengthening treatment can give higher mechanical strength to a glass article obtained from the glass composition of (2). Even when the glass is subjected to a high-temperature heat treatment, the glass is not deformed more certainly. Further, unevenness caused by alkali elution is more certainly prevented from being formed on a surface thereof.

The invention provides (3) the glass composition of (1) or (2), which has a glass transition point of 560° C. or higher.

Further, the invention provides (4) the glass composition of any one of (1) to (3), which has a thermal expansion coefficient of $70 \times 10^{-7}/°$ C. or higher as measured in the range of from −50° C. to 70° C., and a thermal expansion coefficient of $80 \times 10^{-7}/°$ C. or higher as measured in the range of from 50° C. to 350° C.

According to the glass composition of (4), when a glass having the glass composition is adhered or joined to a metal, occurrence of the strain, displacement or crack breakage of the glass caused by the difference in the coefficient of thermal expansion is inhibited, because the coefficient of thermal expansion of the glass approximates to that of the metal material.

According to the invention, there is further provided (5) a chemically strengthened glass article obtained by immersing a glass article comprising the glass composition described in any one of (1) to (4) in a molten salt containing monovalent cations having an ionic radius larger than that of Na ions to conduct an ion-exchange treatment between the Na ions and the monovalent cations.

According to the glass article of (5), a compression stress layer is formed on a surface of the glass article, so that the glass article can be prevented from being broken even when shock is given from the outside.

The invention provides (6) a glass substrate for magnetic recording media, essentially comprising:

60 to 70 wt % $SiO_2$;
5 to 20 wt % $Al_2O_3$;
0 to 1 wt % $Li_2O$;
3 to 18 wt % $Na_2O$;
0 to 9 wt % $K_2O$;
0 to 10 wt % MgO;
1 to 15 wt % CaO;
0 to 4.5 wt % SrO;
0 to 1 wt % BaO;
0 to 1 wt % $TiO_2$; and
0 to 1 wt % $ZrO_2$,
wherein the sum of $Li_2O$, $Na_2O$ and $K_2O$ is from 5 to 25 wt %, and the sum of MgO, CaO, SrO and BaO is from 5 to 20 wt %.

According to the glass substrate of (6), even when the glass substrate is subjected to high-temperature heating in forming a magnetic recording layer on a surface thereof, a roughness in surface of the glass or a deformation of the glass is caused, and concavo-convex formation attributable to an alkali elution are not caused on the surface of the substrate to allow the surface to be kept smooth.

The invention further provides (7) the glass substrate for magnetic recording media according to (6), which essentially comprises:

60 to 70 wt % $SiO_2$;
8 to 15 wt % $Al_2O_3$;
8 to 16 wt % $Na_2O$;
0 to 3.5 wt % $K_2O$;
2 to 5 wt % MgO;
3 to 7.5 wt % CaO;
0 to 4.5 wt % SrO; and
0 to 1 wt % $ZrO_2$,
wherein the sum of $Na_2O$ and $K_2O$ is from 11 to 18 wt %, and the sum of MgO, CaO and SrO is from 7 to 14 wt %.

According to the glass substrate of (7), even when the glass substrate is subjected to high-temperature heating in forming a magnetic recording layer on a surface thereof, a roughness in surface of the glass or a deformation of the glass is caused with even more efficient, and concavo-convex formation attributable to an alkali elution are not caused on the surface of the substrate with even more efficient, to allow the surface to be kept more smooth.

The invention provides (8) the glass substrate for magnetic recording media described in (6) or (7), which has a glass transition point of 560° C. or higher.

According to the glass substrate of (8), even when the glass substrate is subjected to heating in a molten salt in chemically strengthening the glass substrate, or heating in forming a magnetic recording layer on the glass substrate, occurrence of warping in the glass substrate can be prevented. Further, in forming the magnetic recording layer, formation of projections attributable to an alkali elution on a surface of the glass substrate can be inhibited.

There is further provided (9) the glass substrate for magnetic recording media described in any one of (6) to (8), which has a thermal expansion coefficient of $70 \times 10^{-7}/°$ C. or higher as measured in the range of from −50° C. to 70° C., and a thermal expansion coefficient of $80 \times 10^{-7}/°$ C. or higher as measured in the range of from 50° C. to 350° C.

According to the glass substrate of (9), the coefficient of thermal expansion of the glass substrate approximates to that of the metal, particularly stainless steel. Accordingly, even when the glass substrate is attached to a metal rotational axis of a magnetic recording device and driven for rotation at high speed, occurrence of the following defects can be prevented: changes in dimension and warping of the glass by heat is not generated and thereby the glass does not deviate from a rotational axis during a rotation, in addition the position of the head does not deviate during a driving of disc.

The invention provides (10) a chemically strengthened glass substrate for magnetic recording media obtained by immersing the glass substrate of any one of (6) to (9) in a molten salt containing monovalent cations having an ionic radius larger than that of Na ions to conduct an ion-exchange treatment between the Na ions and the monovalent cations.

According to the chemically strengthened glass substrate of (10), a compression stress layer is formed deeply in a surface of the glass substrate, so that breakage of the substrate by external force can be prevented.

The invention further provides (11) the chemically strengthened glass substrate for magnetic recording media described in (10), wherein the load at which a crack is developed with a probability of 50% by depressing a diamond penetrator of a micro Vickers hardness tester toward the substrate is 800 g or more.

According to the chemically strengthened glass substrate of (11), the load at which a crack is developed with a probability of 50% by depressing a diamond penetrator of a micro Vickers hardness tester toward the substrate is 800 g or more. Accordingly, even when external force is applied to a surface of the glass substrate to form an impression thereon, the probability of vertically developing a crack around the impression can be reduced. This can inhibit a reduction in glass strength, even when in a process of producing a magnetic recording medium by forming a magnetic recording layer, the glass substrate is placed on stainless steal support fittings and moved, or transferred between jigs to form fine scratches on a surface of the glass substrate. In a device in which a recording head gets off out of a disk in stopping, that is, a device having a ramped loading which has now prevailed among magnetic recording devices, the substrate can be prevented from being cracked by shock generated when the recording head is loaded on the medium in starting.

The invention provides (12) a method for producing a sheet glass by a float process comprising blending raw materials for a glass so as to give a molten glass having the following composition, and introducing the molten glass obtained by melting the raw materials onto a bath of tin to form it in a sheet shape:

60 to 70 wt % $SiO_2$;
5 to 20 wt % $Al_2O_3$;
0 to 1 wt % $Li_2O$;
3 to 18 wt % $Na_2O$;
0 to 9 wt % $K_2O$;
0 to 10 wt % MgO;
1 to 15 wt % CaO;
0 to 4.5 wt % SrO;
0 to 1 wt % BaO;
0 to 1 wt % $TiO_2$; and
0 to 1 wt % $ZrO_2$, wherein the sum of $Li_2O$, $Na_2O$ and $K_2O$ is from 5 to 25 wt %, and the sum of MgO, CaO, SrO and BaO is from 5 to 20 wt %.

According to the method of (12), the molten glass can be directly introduced from a glass-melting furnace onto a molten tin bath, and formed into a sheet shape. This makes it possible to obtain raw sheet glasses for obtaining the glass substrates for magnetic recording media having a specified thickness in large amounts.

There is further provided (13) the method for producing a sheet glass by a float process according to (12), which comprises blending raw materials for a glass so as to give a molten glass having the following composition, and introducing the molten glass obtained by melting the raw materials onto a bath of tin to form it in a sheet shape:

60 to 70 wt % $SiO_2$;
8 to 15 wt % $Al_2O_3$;
8 to 16 wt % $Na_2O$;
0 to 3.5 wt % $K_2O$;
2 to 5 wt % MgO;
3 to 7.5 wt % CaO;
0 to 4.5 wt % SrO; and
0 to 1 wt % $ZrO_2$, wherein the sum of $Na_2O$ and $K_2O$ is from 11 to 18 wt %, and the sum of MgO, CaO and SrO is from 7 to 14 wt %.

According to the method of (13), the molten glass can be directly introduced from a glass-melting furnace onto a molten tin bath, and formed into the sheet shape more effectively without formation of an unmelted or devitrified material of the glass. This makes it possible to obtain raw sheet glasses for obtaining glass substrates for magnetic recording media having a specified thickness in large quantities.

The invention provides (14) the method of (12) or (13), wherein the sheet glass has a glass transition point of 560° C. or higher.

According to the method of (14), the glass transition point is 560° C. or higher, so that heat resistance at high temperatures can be ensured.

The invention further provides (15) the method of any one of (12) to (14), wherein the sheet glass has a thermal expansion coefficient of $70 \times 10^{-7}$/° C. or higher as measured in the range of from −50° C. to 70° C., and a thermal expansion coefficient of $80 \times 10^{-7}$/° C. or higher as measured in the range of from 50° C. to 350° C.

According to the method of (15), raw sheet glasses suitable for the glass substrates for magnetic recording media can be formed.

DETAILED DESCRIPTION OF THE INVENTION

Modes for carrying out the invention will be explained below in detail. Reasons for limitations on the content of components of the glass composition of the invention will be explained below. Percentages are by weight in the following descriptions.

$SiO_2$ is a main component constituting the glass. When the content thereof is lower than 60%, the glass is deteriorated in heat resistance and chemical durability. On the other hand, exceeding 70% results in an increase in viscosity of the glass at high temperatures, which causes difficulty in melting and forming it. The content of $SiO_2$ is therefore required to be from 60 to 70%.

$Al_2O_3$ is an indispensable component for improving the heat resistance and chemical durability of the glass and facilitating chemical strengthening. When the content thereof is lower than 5%, these effects are not sufficiently achieved. On the other hand, when the content thereof exceeds 20%, the liquidus temperature of the glass is elevated to deteriorate formability thereof into a sheet shape. The content of $Al_2O_3$ is therefore required to be from 5 to 20%. It is preferably 8% or higher and 15% or lower for attaining a proper balance between the heat resistance (glass transition point) and chemical durability of the glass.

$Li_2O$, $Na_2O$ and $K_2O$ (these are hereinafter generically named $R_2O$) are components for reducing the viscosity of the glass to facilitate melting of the glass, lowering the liquidus temperature to enhance the formability into a sheet shape, and further heightening the coefficient of thermal expansion. In order to obtain these effects, the sum of the three components is required to be 5% or higher. On the other hand, when the sum of these components exceeds 25%, the heat resistance of the glass deteriorates, and further, the chemical durability deteriorates. Accordingly, the total content of $Li_2O$, $Na_2O$ and $K_2O$ is required to be from 5 to 25%. Furthermore, the total content of these is preferably 11% or higher and 18% or lower for attaining a proper balance between the heat resistance and chemical durability of the glass.

Of $R_2O$, $Li_2O$ is particularly a component for improving the strength of the glass by substitution of Li ions with other cations such as Na ions and K ions in the molten salt. However, $Li_2O$ has the disadvantage that an increase in its content impairs the heat resistance of the glass. The content of $Li_2O$ is therefore required to be 1% or lower, and it is preferred that the content of $Li_2O$ is substantially an impurity amount.

$Na_2O$ is a component for improving the strength of the glass by substitution with other cations such as K ions in the molten salt. Of $R_2O$, raw materials therefor are inexpensive and easily available. In respect to raw material cost, it is preferred that the ratio of $Na_2O$ to $R_2O$ is increased. When the content is lower than 3%, it becomes difficult to obtain the chemically strengthened glass having sufficient strength, resulting in insufficient manifestation of the effect. From this viewpoint, it is preferred that the content is 8% or higher. On the other hand, when the content exceeds 18%, the heat resistance of the glass is largely impaired, so that the content is required to be 18% or lower. For ensuring the heat resistance of the glass more certainly, the content is preferably 15% or lower.

Of $R_2O$, $K_2O$ has the advantage that the heat resistance is hard to be impaired. However, when the content thereof exceeds 9%, a compression stress necessary for ensuring strength by an ion-exchange treatment with a molten salt of potassium nitrate ordinarily used can not be formed in a surface of the glass. The content of $K_2O$ is therefore required to be from 0 to 9%, and is preferably from 0 to 3.5%.

MgO, CaO, SrO and BaO (these are hereinafter generically named RO) are components for reducing the viscosity of the glass to facilitate melting of the glass. Further, these have the effect of heightening the coefficient of thermal expansion, although a contribution thereto is small compared to $R_2O$. In order to obtain these effects, the sum of the four components is required to be 5% or higher, and is preferably 7% or higher. On the other hand, when the sum of these components exceeds 20%, it becomes difficult to chemically strengthen the glass to obtain the strengthened glass. The sum is therefore required to be 20% or lower. Exceeding 14% results in a rise in the devitrification temperature of the glass, which is unfavorable in that it becomes difficult to form the sheet glass by the float process in which the molten glass is directly introduced from a glass-melting furnace onto a molten tin bath and formed into a sheet shape. Accordingly, the total amount of RO is preferably 7% or higher and 14% or lower for obtaining the chemically strengthened glass and making it possible to directly forming the sheet glass by the float process.

Of RO, MgO has the advantage that it is hard to exert an adverse effect on chemical strengthening. However, MgO has a strong tendency to elevate the devitrification temperature of the glass, so that the content of MgO is required to be from 0 to 10%. From the viewpoint of maintenance of chemical properties of the glass, the content of MgO is preferably 2% or higher, and from the viewpoint of inhibition of a devitrification phenomenon of the glass, it is preferably 5% or lower.

Of RO, CaO does not exert a significant adverse effect on the devitrification temperature of the glass, and is an indispensable component for inhibiting an adverse effect on chemical strengthening and improving meltability, compared to SrO. Less than 1% results in insufficient manifestation of the effect, whereas exceeding 15% results in a rise in the devitrification temperature of the glass to deteriorate glass formability. The content of CaO is therefore required to be from 1 to 15%. From the viewpoints of preparation of the glass which can be chemically strengthened and ensuring of meltability of the glass, the content of CaO is preferably 3% or higher. Further, from the viewpoint of inhibition of a rise in the devitrification temperature of the glass, it is preferably 7.5% or lower.

Of RO, SrO particularly has the advantage that it does not elevate the devitrification temperature. However, SrO has the property of preventing the transfer of an alkali ($R_2O$) contained in the glass. Accordingly, when the content of SrO exceeds 4.5%, chemical strengthening becomes difficult. Further, a large quantity of SrO contained in the glass increases the density of the glass. The content of SrO is therefore required to be 4.5% or lower.

Of RO, BaO particularly has the advantage that it dose not elevate the devitrification temperature. However, of RO, BaO has the property of most preventing the transfer of an alkali contained in the glass. Accordingly, when the content of BaO increases, it becomes difficult to chemically strengthen the glass by an ion exchange. Further, a large quantity of BaO contained in the glass increases the density of the glass. Furthermore, a barium raw material is a poisonous substance, so that handling thereof is difficult.

The content of BaO is therefore required to be 1% or lower, and it is preferred that the content of BaO is substantially an impurity amount.

$TiO_2$ is a component for improving meltability without deteriorating the heat resistance of the glass. When the content of $TiO_2$ exceeds 1%, the devitrification temperature of the glass is elevated to deteriorate formability thereof. Further, $TiO_2$ colors the glass yellow by the coexistence with iron contained in the glass, which is caused by iron generally contained as an impurity in raw materials for glass. Accordingly, a difficulty is encountered with regard to recycling of $TiO_2$-containing glass. The content of $TiO_2$ is therefore required to be 1% or lower, and it is preferred that the content of $TiO_2$ is substantially an impurity amount.

$ZrO_2$ is a component for improving the heat resistance of the glass. When the content of $ZrO_2$ exceeds 1%, the devitrification temperature of the glass is elevated to deteriorate formability there of into a sheet shape. The content of $ZrO_2$ is therefore required to be 1% or lower.

In the invention, components other than the above-mentioned components, for example, $Sb_2O_3$, $As_2O_5$, $SO_3$, $SnO_2$ and F in a fluorine-containing compounds as glass clarifying agents for defoaming in melting, transition metal compounds such as $Fe_2O_3$, CoO and NiO for coloring the glass, and other impurities of glass raw material origin, can each be contained within the range not exceeding 0.5% by weight.

When the glass components are selected within the above-mentioned content ranges in the glass composition of the invention, and the working temperature of the glass and the devitrification temperature of the glass indicated by ° C. satisfy the relationship (a value of the working temperature)−(a value of the devitrification temperature)$\leq$−17, the glass preferable for directly forming the sheet glass by the float process in which the molten glass is directly introduced from a glass-melting furnace onto a molten tin bath and formed into a sheet shape can be obtained.

The glass composition of the invention has a glass transition point of 560° C. or higher. Accordingly, the properties thereof are not deteriorated, for example, even when it is subjected to a heating process in forming the magnetic recording layer on the glass substrate by sputtering film formation. In particular, the composition is suitable for the substrate for perpendicular magnetic recording media, which is heated at high temperatures.

The glass composition of the invention has a thermal expansion coefficient of $7 \times 10^{-7}$/° C. or higher as measured in the range of from −50° C. to 70° C., and a thermal expansion coefficient of $80 \times 10^{-7}$/° C. or higher as measured in the range of from 50° C. to 350° C. Accordingly, even when the glass composition is adhered or joined to a metal material, no crack caused by the difference in expansion between the materials by changes in temperature is developed in the glass, and furthermore, no breakage thereof occurs. In respect to a phenomenon of dimensional expansion and contraction of the glass by changes in temperature, for example, even when a recording track of the magnetic recording medium is narrowed, a tracking error caused by the difference in thermal expansion between the glass and the metal structural material can be inhibited or avoided.

The glass composition of the invention can be enhanced in strength by bringing it in contact with a molten salt containing monovalent cations having an ionic radius larger than that of Na ions, for example, potassium nitrate or a mixed salt of potassium nitrate and sodium nitrate, to give a surface compression stress by an ion exchange. The composition is therefore suitable for a high-speed rotary magnetic disk drive (HDD). The glass substrate obtained from the glass composition of the invention can ensure sufficient strength even when thinned. Accordingly, the substrate can be used as a substrate for a panel such as a liquid crystal display or the like.

EXAMPLES

The invention will be explained below in more detail by reference to examples. Glasses of Examples 1 to 19 having glass compositions of the invention were prepared by melting experiments, and the melting temperature, the working temperature, the glass transition point, the coefficient of linear expansion, the specific gravity, the Young's modulus and the pressure at which a crack is developed with a probability of 50% were measured for the resulting glasses. Results thereof are shown in Tables 1 and 2. Further, a glass disclosed in Example 3 of Japanese Patent No. 2,837,134 and a glass disclosed in JP-A-9-2836 were prepared by melting experiments, and results thereof are shown as Comparative Examples 1 and 2, respectively, in Table 1.

The preparation of the glassed of Examples 1 to 19 and Comparative Examples 1 and 2 and measurements of the properties of the resulting glasses were conducted according to the following procedures.

TABLE 1

| Item | | Example 1 | Example 2 | Example 3 | Example 4 |
|---|---|---|---|---|---|
| Composition (% by weight) | $SiO_2$ | 61.7 | 60.8 | 62.3 | 62.2 |
| | $Al_2O_3$ | 10.5 | 10.3 | 10.5 | 14.1 |
| | $Li_2O$ | 0.0 | 0.0 | 0.0 | 0.0 |
| | $Na_2O$ | 9.8 | 9.6 | 9.8 | 14.1 |
| | $K_2O$ | 6.4 | 5.8 | 6.0 | 0.0 |
| | MgO | 3.2 | 1.9 | 3.2 | 3.3 |
| | CaO | 7.7 | 7.6 | 8.2 | 6.1 |
| | SrO | 0.8 | 4.0 | 0.0 | 0.0 |
| | BaO | 0.0 | 0.0 | 0.0 | 0.0 |
| | $TiO_2$ | 0.0 | 0.0 | 0.0 | 0.0 |
| | $ZrO_2$ | 0.0 | 0.0 | 0.0 | 0.3 |
| | $R_2O$ | 16.2 | 15.4 | 15.8 | 14.1 |
| | RO | 11.7 | 13.5 | 11.4 | 9.4 |
| Melting temperature (log $\eta$ = 2) [° C.] | | 1522 | 1540 | 1545 | 1535 |
| Working temperature (log $\eta$ = 4) [° C.] | | 1089 | 1094 | 1097 | 1103 |
| Devitrification temperature [° C.] | | 1158 | 1147 | 1156 | 1140 |
| Working temperature [° C.] – Devitrification temperature [° C.] | | −69 | −53 | −59 | −37 |
| Glass Transition Point [° C.] | | 584 | 583 | 588 | 606 |
| Coefficient of linear expansion α (50 to 350° C.) [×10$^{-7}$/° C.] | | 94 | 96 | 94 | 86 |
| Coefficient of linear expansion α (−50 to 70° C.) [×10$^{-7}$/° C.] | | 79 | 82 | 80 | 73 |
| Specific gravity [g/cm³] | | 2.2 | 2.6 | 2.5 | 2.5 |
| Young's modulus [GPa] | | 75 | 77 | 76 | 76 |
| Load at which a crack is developed with a probability of 50% [g] | | 800 | 800 | 1400 | >2000 |

| Item | | Example 5 | Example 6 | Example 7 | Example 8 |
|---|---|---|---|---|---|
| Composition (% by weight) | $SiO_2$ | 63.5 | 65.3 | 65.3 | 64.3 |
| | $Al_2O_3$ | 10.4 | 10.6 | 10.6 | 10.5 |
| | $Li_2O$ | 0.0 | 0.0 | 0.0 | 0.0 |
| | $Na_2O$ | 9.7 | 13.9 | 13.9 | 9.8 |
| | $K_2O$ | 1.9 | 0.0 | 0.0 | 2.2 |
| | MgO | 2.0 | 3.2 | 3.2 | 3.2 |
| | CaO | 7.5 | 6.0 | 6.0 | 5.9 |
| | SrO | 4.1 | 0.0 | 0.0 | 4.1 |
| | BaO | 0.0 | 0.0 | 0.0 | 0.0 |
| | $TiO_2$ | 0.0 | 0.0 | 1.0 | 0.0 |
| | $ZrO_2$ | 1.0 | 1.0 | 0.0 | 0.0 |
| | $R_2O$ | 11.6 | 13.9 | 13.9 | 12.0 |
| | RO | 13.6 | 9.2 | 9.2 | 13.2 |
| Melting temperature (log $\eta$ = 2) [° C.] | | 1562 | 1550 | 1547 | 1597 |
| Working temperature log $\eta$ = 4) [° C.] | | 1120 | 1093 | 1091 | 1131 |
| Devitrification temperature [° C.] | | 1155 | 1126 | 1123 | 1119 |
| Working temperature [° C.] – Devitrification temperature [° C.] | | −35 | −33 | −32 | 12 |
| Glass Transition Point [° C.] | | 611 | 594 | 590 | 605 |
| Coefficient of linear expansion α (50 to 350° C.) [×10$^{-7}$/° C.] | | 82 | 85 | 85 | 79 |
| Coefficient of linear expansion α (−50 to 70° C.) [×10$^{-7}$/° C.] | | 72 | 73 | 73 | 71 |
| Specific gravity [g/cm³] | | 2.6 | 2.5 | 2.5 | 2.5 |
| Young's modulus [GPa] | | 77 | 76 | 76 | 77 |
| Load at which a crack is developed with a probability of 50% [g] | | 900 | >2000 | >2000 | 1200 |

| Item | | Example 9 | Example 10 | Comparative Example 1 | Comparative Example 2 |
|---|---|---|---|---|---|
| Composition (% by weight) | $SiO_2$ | 64.6 | 61.1 | 58.0 | 63.0 |
| | $Al_2O_3$ | 10.5 | 10.3 | 7.0 | 14.0 |
| | $Li_2O$ | 0.0 | 0.0 | 0.0 | 6.0 |
| | $Na_2O$ | 9.8 | 9.7 | 4.2 | 10.0 |
| | $K_2O$ | 2.2 | 5.9 | 6.3 | 0.0 |
| | MgO | 4.5 | 3.1 | 2.0 | 0.0 |
| | CaO | 4.2 | 5.9 | 4.8 | 0.0 |
| | SrO | 4.1 | 4.0 | 6.9 | 0.0 |
| | BaO | 0.0 | 0.0 | 7.9 | 0.0 |
| | $TiO_2$ | 0.0 | 0.0 | 0.0 | 0.0 |
| | $ZrO_2$ | 0.0 | 0.0 | 2.9 | 7.0 |
| | $R_2O$ | 12.1 | 15.5 | 10.5 | 16.0 |
| | RO | 12.8 | 13.0 | 21.6 | 0.0 |
| Melting temperature (log $\eta$ = 2) [° C.] | | 1612 | 1535 | 1545 | 1491 |
| Working temperature (log $\eta$ = 4) [°C.] | | 1150 | 1092 | 1145 | 1047 |
| Devitrification temperature [° C.] | | 1137 | 1081 | 1070 | 900 |
| Working temperature [° C.] – Devitrification temperature [° C.] | | 13 | 11 | 75 | 147 |
| Glass Transition Point [° C.] | | 602 | 579 | 615 | 491 |
| Coefficient of linear expansion α (50 to 350° C.) [×10$^{-7}$/° C.] | | 82 | 95 | 84 | 93 |
| Coefficient of linear expansion α (−50 to 70° C.) [×10$^{-7}$/° C.] | | 72 | 80 | 72 | 74 |
| Specific gravity [g/cm³] | | 2.5 | 2.6 | 2.8 | 2.5 |
| Young's modulus [GPa] | | 77 | 75 | 76 | 83 |
| Load at which a crack is developed with a probability of 50% [g] | | 1800 | 1200 | 100 | >2000 |

TABLE 2

| Item | | Example 11 | Example 12 | Example 13 | Example 14 |
|---|---|---|---|---|---|
| Composition (% by weight) | $SiO_2$ | 61.4 | 63.3 | 65.9 | 66.9 |
| | $Al_2O_3$ | 10.4 | 10.5 | 10.7 | 10.7 |
| | $Li_2O$ | 0.0 | 0.0 | 0.0 | 0.0 |
| | $Na_2O$ | 9.7 | 12.9 | 14.0 | 13.0 |
| | $K_2O$ | 5.9 | 0.0 | 0.0 | 0.0 |
| | MgO | 4.4 | 3.2 | 3.3 | 3.3 |
| | CaO | 4.1 | 6.0 | 6.1 | 6.1 |
| | SrO | 4.1 | 4.1 | 0.0 | 0.0 |
| | BaO | 0.0 | 0.0 | 0.0 | 0.0 |
| | $TiO_2$ | 0.0 | 0.0 | 0.0 | 0.0 |
| | $ZrO_2$ | 0.0 | 0.0 | 0.0 | 0.0 |
| | $R_2O$ | 15.6 | 12.9 | 14.0 | 13.0 |
| | RO | 12.6 | 13.3 | 9.3 | 9.3 |
| Melting temperature (log $\eta$ = 2) [° C.] | | 1538 | 1536 | 1531 | 1606 |
| Working temperature (log $\eta$ = 4) [° C.] | | 1093 | 1091 | 1101 | 1133 |
| Devitrification temperature [° C.] | | 1087 | 1093 | 1106 | 1150 |
| Working temperature [° C.] − Devitrification temperature [° C.] | | 6 | −2 | −5 | −17 |
| Glass Transition Point [° C.] | | 582 | 591 | 590 | 598 |
| Coefficient of linear expansion α (50 to 350° C.) [×10$^{-7}$/° C.] | | 89 | 86 | 89 | 80 |
| Coefficient of linear expansion α (−50 to 70° C.) [×10$^{-7}$/° C.] | | 75 | 73 | 75 | 71 |
| Specific gravity [g/cm$^3$] | | 2.5 | 2.6 | 2.5 | 2.5 |
| Young's modulus [GPa] | | 76 | 77 | 75 | 74 |
| Load at which a crack is developed with a probability of 50% [g] | | 900 | 1400 | >2000 | >2000 |

| Item | | Example 15 | Example 16 | Example 17 | Example 18 |
|---|---|---|---|---|---|
| Composition (% by weight) | $SiO_2$ | 65.6 | 65.1 | 66.4 | 66.6 |
| | $Al_2O_3$ | 10.7 | 10.6 | 10.8 | 9.9 |
| | $Li_2O$ | 0.0 | 0.0 | 1.0 | 0.0 |
| | $Na_2O$ | 14.0 | 13.9 | 12.1 | 14.0 |
| | $K_2O$ | 0.0 | 0.0 | 0.0 | 0.0 |
| | MgO | 2.9 | 2.9 | 3.3 | 3.2 |
| | CaO | 6.5 | 5.6 | 6.1 | 6.1 |
| | SrO | 0.0 | 1.7 | 0.0 | 0.0 |
| | BaO | 0.0 | 0.0 | 0.0 | 0.0 |
| | $TiO_2$ | 0.0 | 0.0 | 0.0 | 0.0 |
| | $ZrO_2$ | 0.3 | 0.3 | 0.3 | 0.3 |
| | $R_2O$ | 14.0 | 13.9 | 13.1 | 14.0 |
| | RO | 9.4 | 10.1 | 9.4 | 9.3 |
| Melting temperature (log $\eta$ = 2) [° C.] | | 1567 | 1563 | 1549 | 1565 |
| Working temperature (log $\eta$ = 4) [° C.] | | 1099 | 1096 | 1089 | 1097 |
| Devitrification temperature [° C.] | | 1106 | 1079 | 1120 | 1115 |
| Working temperature [° C.] − Devitrification temperature [° C.] | | −7 | 17 | −31 | −18 |
| Glass Transition Point [° C.] | | 591 | 586 | 560 | 587 |
| Coefficient of linear expansion α (50 to 350° C.) [×10$^{-7}$/° C.] | | 86 | 87 | 84 | 82 |
| Coefficient of linear expansion α (−50 to 70° C.) [×10$^{-7}$/° C.] | | 74 | 74 | 73 | 72 |
| Specific gravity [g/cm$^3$] | | 2.5 | 2.5 | 2.5 | 2.5 |
| Young's modulus [GPa] | | 76 | 75 | 76 | 76 |
| Load at which a crack is developed with a probability of 50% [g] | | >2000 | 1800 | 1375 | >2000 |

| Item | | Example 19 |
|---|---|---|
| Composition (% by weight) | $SiO_2$ | 65.3 |
| | $Al_2O_3$ | 10.6 |
| | $Li_2O$ | 0.0 |
| | $Na_2O$ | 13.9 |
| | $K_2O$ | 0.0 |
| | MgO | 3.1 |
| | CaO | 5.8 |
| | SrO | 0.0 |
| | BaO | 1.0 |
| | $TiO_2$ | 0.0 |
| | $ZrO_2$ | 0.3 |
| | $R_2O$ | 13.9 |
| | RO | 9.9 |
| Melting temperature (log $\eta$ = 2) [° C.] | | 1561 |
| Working temperature (log $\eta$ = 4) [° C.] | | 1097 |
| Devitrification temperature [° C.] | | 1106 |
| Working temperature [° C.] − Devitrification temperature [° C.] | | −9 |
| Glass Transition Point [° C.] | | 583 |
| Coefficient of linear expansion α (50 to 350° C.) [×10$^{-7}$/° C.] | | 86 |
| Coefficient of linear expansion α (−50 to 70° C.) [×10$^{-7}$/° C.] | | 74 |
| Specific gravity [g/cm$^3$] | | 2.6 |
| Young's modulus [GPa] | | 75 |
| Load at which a crack is developed with a probability of 50% [g] | | >2000 |

(Preparation of Glass Substrates for Magnetic Recording Media)

First, using silica, alumina, lithium carbonate, sodium carbonate, potassium carbonate, basic magnesium carbonate, calcium carbonate, strontium carbonate, barium carbonate, titanium oxide and zirconium oxide which are common glass raw materials, batches were prepared so as to result in compositions shown in Tables 1 and 2. Each of the batches thus prepared was heated in an electric furnace by keeping each batch in a platinum crucible at 1550° C. for 4 hours to obtain a molten glass. The resultant molten glass was poured on an iron sheet outside the furnace and cooled to form a glass block. After these glasses were kept at 650° C. for 30 minutes in the electric furnace, a power supply of the furnace was turned off to allow them to cool slowly to room temperature, thereby obtaining sample glasses.

Each sample glass was processed into a columned form having a diameter of 5 mm and a length of 15 mm, and the coefficient of thermal expansion and the glass transition point thereof were measured with a differential thermal dilatometer (Thermoflex TMA 8140, Rigaku).

Each sample glass was pulverized. Glass grains which had passed through a 2380-μm sieve and stayed on a 1,000-μm sieve were immersed in ethanol, and subjected to ultrasonic cleaning, followed by drying in a thermostat. Twenty-five grams of the glass grains were placed in a platinum boat having a width of 12 mm, a length of 200 mm and a depth of 10 mm so as to give an approximately constant thickness, and kept in an electric furnace having a temperature gradient of from 930 to 1180° C. Then, the grains were taken out of the furnace, and devitrification generated in the inside of the glass was observed under a 40-power optical microscope. The maximum temperature at which devitrification was observed was taken as the devitrification temperature.

The sample glass was cut into a doughnut shape having an outer diameter of 68 mm and an inner diameter of 20 mm, and polished with alumina abrasive grains. Both faces of the glass were further mirror-polished (surface roughness Ra: 2 nm or less; JIS B 0601-1994) with cerium oxide abrasive grains to form a 0.635-mm thick glass substrate (disk) for magnetic recording media. This disk was washed with a commercial alkali detergent, and then immersed for 10 minutes in a molten salt of potassium nitrate heated at 440° C. to conduct a chemical strengthening treatment. In Comparative Example 1 in which the glass transition point of the glass is low, the composition of salts and the temperature were adjusted to the conditions disclosed in Japanese Patent No. 2,837,134, and the disk was immersed in a mixed molten salt of potassium nitrate (60%) and sodium nitrate (40%) for 10 minutes to conduct chemical strengthening. The disk was washed again with the commercial detergent to obtain a substrate for magnetic recording media. Using a diamond penetrator (quadrangular pyramid-penetrator having an angle of 136 degrees between opposite faces) of a micro Vickers hardness tester (MVK-G2, AKASHI CORPORATION), a load of 50 to 2000 g was applied to a recording surface of this substrate, and the pressure at which a vertical crack is developed around the impression with a probability of 50% was measured.

The glass composition was analyzed using wet chemical glass analysis in combination with atomic absorption spectro-photometry.

The specific gravity was measured by the Archimedes method, and the Young's modulus was measured according to JIS R 1602 (the method for testing the elastic modulus of fine ceramics).

In Examples of the invention, the coefficient of thermal expansion as measured in the range of from −50° C. to 70° C. was within the range of $71 \times 10^{-7}/°C.$ to $82 \times 10^{-7}/°C.$, and $70 \times 10^{-7}/°C.$ or higher in all.

As shown in Tables 1 and 2, all glasses of Examples 1 to 19 of the invention have a glass transition point of 560° C. or higher, and high in heat resistance compared to the glass of Comparative Example 1 which has a glass transition point of 491° C. Accordingly, the glasses of the invention are excellent as members used at high temperatures or subjected to high-temperature processes.

The glasses of Examples 1 to 19 of the invention have a pressure of 800 g or more at which a crack is developed with a probability of 50%, after the chemical strengthening treatment, and have a high value compared to the glass of Comparative Example 2 which is disclosed as a high heat-resistant glass. This reveals that the glasses having the compositions of the invention have both the high heat resistance and the high degree of chemical strengthening.

In contrast, the glass of Comparative Example 1 has a glass transition point as high as 615° C. and high heat resistance. However, the pressure at which a crack is developed with a probability of 50% is as low as 100 g. Accordingly, the glass does not have both the high heat resistance and the high degree of chemical strengthening (crack resistance). Further, the glass of Comparative Example 2 has a high degree of the load exceeding 2000 g, at which a crack is developed with a probability of 50%, but a glass transition point as low as 491° C. Similarly to Comparative Example 1, therefore, the glass does not have both the high heat resistance and the high degree of chemical strengthening.

In Examples 8 to 16 and 19, (a value of the working temperature)—(a value of the devitrification temperature) is −17° C. or lower. This is useful in that the sheet glasses can be formed by the float process without occurrence of devitrification.

Preparation of Magnetic Recording Media

Then, using the glass substrates for magnetic recording media having the compositions of Example 13, Comparative Examples 1 and 2, respectively, magnetic recording media were prepared in the following manner. Each sample glass was cut into a doughnut shape having an outer diameter of 68 mm and an inner diameter of 20 mm, and mirror-polished (surface roughness Ra: 2 nm or less; JIS B 0601-1994) by polishing of edges of inner and outer peripheries, polishing of both faces (faces acting as recording faces) with alumina abrasive grains, and polishing using cerium oxide abrasive grains, thereby forming a 0.635-mm thick glass substrate.

These glass substrates were each washed with a commercial alkali detergent. Then, the glass substrates of Example 13 and Comparative Example 2 were each immersed for 4 hours in a molten salt of potassium nitrate heated at 440° C. to conduct chemical strengthening, and further washed again with the commercial alkali detergent. The glass substrate of Comparative Example 1 was washed with the commercial alkali detergent, thereafter immersed in a mixed molten salt of potassium nitrate (60 wt %) and sodium nitrate (40 wt %) for 4 hours to conduct chemical strengthening, and washed again with the commercial alkali detergent. The resultant glass substrates were each heated at 400° C., and a Cr film, a Co—Cr—Ta alloy film, and a carbon film were successively formed thereon as an undercoat layer, a recording layer and a protective layer, respectively, by sputtering. Further, the protective layer was coated with a fluorocarbon-based lubricating oil to prepare each magnetic recording medium.

The resultant magnetic recording media were each subjected to a rotational driving test using a test device based on a closed-type magnetic recording device (HDD). In the rotational driving test, each magnetic recording medium was fitted and fixed on a stainless steel rotational shaft having a radius somewhat smaller than that of an inner periphery of the magnetic recording medium, and driven for rotation at 416.7 rounds per second (25,000 rpm). As a result, for the magnetic recording medium of Comparative Example 1, damage occurred during rotation, which was conceivably caused by the insufficient degree of chemical strengthening. However, for the magnetic recording media of Example 13 and Comparative Example 2, such damage did not occur.

Then, the magnetic recording media were each subjected to a fixed-point floatation test and a continuous seek test. The fixed-point floatation test was conducted under a reduced pressure of 26.7 kPa for 24 hours, and the presence or absence of head crushing was examined under an optical microscope. The continuous seek test was conducted at a flying height of 15 nm at a rotation speed of 166.7 rounds per second (10,000 rpm) for 1,000 hours, and the presence or absence of head crushing was examined under an optical microscope. For the magnetic recording media using the glass substrates obtained from the sample glasses of Example 13 and Comparative Example 1, no head crushing error occurred. In contrast, for the magnetic recording medium using the glass substrate obtained from the sample glass of Comparative Example 2, a head crushing error caused by collision of the recording head with a recording face occurred frequently. The reasons why such difference was made are not clearly revealed. However, the reasons for this is conceivably that the high heat resistance of the glass causes no occurrence of warping and deformation due to softening even when the glass is heated at high temperatures in the formation process of the magnetic recording film, that minute strains formed on a surface of the glass by polishing are not thermally relaxed, and that the alkali components ($R_2O$) in the glass are not deposited on the surface to form no minute projections.

Further, when the recording head flies over the magnetic recording face, slightly spaced therefrom, or runs while instantaneously touching thereon, the presence of the minute projections on the surface of the glass generates more frictional heat. This heat is unfavorable because it causes thermal noises.

According to the glass article having the glass composition of the invention, the composition of the glass is defined within the specified range, so that the crack developing probability is reduced by application of the chemical strengthening treatment. Accordingly, mechanical strength having high reliability can be given. Further, even when the glass is subjected to a high-temperature heat treatment, the glass is not deformed. Furthermore, no projections caused by alkali elution are formed on the surface thereof.

According to the glass substrate for magnetic recording media obtained by processing the sheet glass having the glass composition of the invention into a disk, even when the glass substrate is subjected to high-temperature heating in forming the magnetic recording layer on the surface thereof, the heat resistance is high, thereby deformation of the glass is not generated, and also projections attributable to alkali elution on a glass surface are not formed on the surface of the substrate to allow the surface to be kept mirror-finished and smooth.

In addition, according to the glass substrate having the glass composition of the invention, even when the glass substrate is attached to a metal rotational axis of a magnetic recording device and driven for rotation at high speed, occurrence of defects such as crack breakage caused by changes in dimension by heat generated or vibration can be prevented, because the coefficient of thermal expansion of the glass substrate approximates to that of the metal, particularly stainless steel.

According to the raw sheet glass for obtaining the glass substrate for magnetic recording media of the invention, the glass composition is within the specified range, and the working temperature and the devitrification temperature are selected so as to satisfy the specified relationship, whereby the glass molten in the glass-melting furnace can be directly introduced onto the molten tin bath, and formed into a sheet shape.

The entire disclosure of each and every foreign patent application from which the benefit of foreign priority has been claimed in the present application is incorporated herein by reference, as if fully set forth.

What is claimed is:

1. A chemically strengthened glass article obtained by immersing a glass article comprising a glass composition in a molten salt containing monovalent cations having an ionic radius larger than that of Na ions to conduct an ion-exchange treatment between the Na ions and the monovalent cations, wherein the glass composition essentially comprises:

60 to 70 wt % $SiO_2$;
8 to 15 wt % $Al_2O_3$;
0 to 1 wt % $Li_2O$;
8 to 16 wt % $Na_2O$;
0 to 3.5 wt % $K_2O$
2 to 5 wt % MgO;
3 to 7.5 wt % CaO;
0 to 4.5 wt % SrO; and
0 to 1 wt % $ZrO_2$,
wherein the sum of $Li_2O$, $Na_2O$ and $K_2O$ is from 11 to 18 wt %, and the sum of MgO, CaO and SrO is from 7 to 14 wt %.

2. The chemically strengthened glass article according to claim 1, which has a glass transition point of 560° C. or higher.

3. The chemically strengthened glass article according to claim 1, which has a thermal expansion coefficient of $70 \times 10^{-7}/°$ C. or higher as measured in the range of from −50° C. to 70° C., and a thermal expansion coefficient of $80 \times 10^{-7}/°$ C. or higher as measured in the range of from 50° C. to 350° C.

4. A chemically strengthened glass substrate for magnetic recording media, which is obtained by immersing a glass substrate for magnetic recording media in a molten salt containing monovalent cations having an ionic radius larger than that of Na ions to conduct an ion-exchange treatment between the Na ions and the monovalent cations, wherein the glass substrate for magnetic recording media essentially comprises:

60 to 70 wt % $SiO_2$;
8 to 15 wt % $Al_2O_3$;
0 to 1 wt % $Li_2O$;
8 to 16 wt % $Na_2O$;
0 to 3.5 wt % $K_2O$;
2 to 5 wt % MgO;
3 to 7.5 wt % CaO;
0 to 4.5 wt % SrO; and
0 to 1 wt % $ZrO_2$,
wherein the sum of $Li_2O$, $Na_2O$ and $K_2O$ is from 11 to 18 wt %, and the sum of MgO, CaO and SrO is from 7 to 14 wt %.

5. The chemically strengthened glass substrate for magnetic recording media according to claim 4, which has a glass transition point of 560° C. or higher.

6. The chemically strengthened glass substrate for magnetic recording media according to claim 4, which has a thermal expansion coefficient of $70 \times 10^{-7}/°$ C. or higher as measured in the range of from −50° C. to 70° C., and a thermal expansion coefficient of $80 \times 10^{-7}/°$ C. or higher as measured in the range of from 50° C. to 350° C.

7. The chemically strengthened glass substrate for magnetic recording media according to claim 4, wherein the load at which a crack is developed with a probability of 50% by depressing a diamond penetrator of a micro Vickers hardness tester toward the substrate, is 800 g or more.

8. A method for producing a chemically strengthened sheet glass by a float process and subsequent chemical strengthening, which comprises: blending raw materials for a glass so as to give a molten glass having the following composition; and introducing the molten glass obtained by melting the raw materials onto a bath of tin to form in a sheet shape:

60 to 70 wt % $SiO_2$;
8 to 15 wt % $Al_2O_3$;
0 to 1 wt % $Li_2O$;
8 to 16 wt % $Na_2O$;
0 to 3.5 wt % $K_2O$;

2 to 5 wt % MgO;
3 to 7.5 wt % CaO;
0 to 4.5 wt % SrO; and
0 to 1 wt % $ZrO_2$,
wherein the sum of $Li_2O$, $Na_2O$ and $K_2O$ is from 11 to 18 wt %, and the sum of MgO, CaO and SrO is from 7 to 14 wt %; and immersing the thus-formed glass sheet or portion thereof in a molten salt containing monovalent cations having an ionic radius larger than that of Na ions to conduct an ion-exchange treatment between the Na ions and the monovalent cations.

9. The method according to claim 8, wherein the sheet glass has a glass transition point of 560° C. or higher.

10. The method according to claim 8, wherein the sheet glass has a thermal expansion coefficient of $70 \times 10^{-7}/°$ C. or higher as measured in the range of from −50° C. to 70° C., and a thermal expansion coefficient of $80 \times 10-7/°$ C. or higher as measured in the range of from 50° C. to 350° C.

* * * * *